United States Patent
Sato (10) Patent No.: US 11,330,156 B2
(45) Date of Patent: May 10, 2022

(54) IMAGE CAPTURING DEVICE

(71) Applicant: Ricoh Company, Ltd., Tokyo (JP)

(72) Inventor: Koichi Sato, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 16/906,052

(22) Filed: Jun. 19, 2020

(65) Prior Publication Data

US 2020/0404135 A1    Dec. 24, 2020

(30) Foreign Application Priority Data

Jun. 20, 2019 (JP) ............................. JP2019-114184

(51) Int. Cl.
*H04N 5/225* (2006.01)
*G03B 13/06* (2021.01)

(52) U.S. Cl.
CPC ......... *H04N 5/22525* (2018.08); *G03B 13/06* (2013.01); *H04N 5/2254* (2013.01)

(58) Field of Classification Search
CPC ... H04N 5/22525; H04N 5/2254; G03B 13/06
See application file for complete search history.

(56) References Cited

U.S. PATENT DOCUMENTS

| | | | | |
|---|---|---|---|---|
| 7,706,678 | B2 * | 4/2010 | Ikeda | ............ G03B 13/06 396/296 |
| 10,404,914 | B2 | 9/2019 | Okamoto | |
| 2016/0269606 | A1 * | 9/2016 | Numako | ............ H04N 5/2353 |
| 2018/0115722 | A1 | 4/2018 | Okamoto | |
| 2018/0198985 | A1 * | 7/2018 | Ishitsuka | ......... H04N 5/232935 |
| 2019/0088706 | A1 | 5/2019 | Sato | |

FOREIGN PATENT DOCUMENTS

| | | | |
|---|---|---|---|
| JP | 2001-128036 A | | 5/2001 |
| JP | 2003-209720 A | | 7/2003 |
| JP | 2011028177 A | * | 2/2011 |
| JP | 2018-067883 A | | 4/2018 |

\* cited by examiner

*Primary Examiner* — Timothy J Henn
*Assistant Examiner* — Fayez A Bhuiyan
(74) *Attorney, Agent, or Firm* — Xsensus LLP (57) ABSTRACT

An image capturing device includes a movable mirror including a half mirror and circuitry to set a superimpose display mode that superimposes and displays an optical image of a finder optical system and an electronic image captured by an image sensor, and a consecutive photographing mode, control the movable mirror to rotate between a mirror-down position, in which the mirror is inserted in a photographing optical path, reflects light to a finder optical system, and transmits the light to an image sensor, and a mirror-up position in which the mirror is retracted from the photographing optical path and the light passes through to the image sensor, and prohibit the movable mirror from rotating to the mirror-up position and maintain the mirror-down position, when the superimpose display mode and the consecutive photographing mode are both set.

15 Claims, 10 Drawing Sheets

IMAGE CAPTURING DEVICE

CROSS-REFERENCE TO RELATED APPLICATIONS

This application is based on and claims priority pursuant to 35 U.S.C. § 119(a) to Japanese Patent Application No. 2019-114184, filed on Jun. 20, 2019, in the Japan Patent Office, the entire disclosure of which is incorporated herein by reference.

BACKGROUND

Technical Field

Embodiments of the present disclosure relate to an image processing system and an image processing method.

Background Art

Image capturing devices, such as digital cameras, are known in the art to include an optical viewfinder and an image display, such as a liquid crystal panel. A user can observe both an optical image through an optical view finder (OVF) and the electronic captured image through an electronic view finder (EVF).

SUMMARY

The present disclosure provides an image capturing device and an image capturing method configured to perform display of a suitable view finder image (smooth and with no delay) even during continuous shooting. The image capturing device includes a movable mirror including a half mirror, and circuitry configured to set a superimposed display mode that superimposes and displays an optical image by a finder optical system and an electronic image by an image sensor, and a consecutive photographing mode, and control the movable mirror to rotate between (1) a mirror down position in which the mirror is inserted in a photographing optical path and reflects a subject light to a finder optical system and transmits the light to an image sensor, and (2) a mirror-up position in which the mirror is retracted from the photographing optical path and the light passes through the image sensor, wherein circuitry is further configured to prohibit the movable mirror from rotating to the mirror up position and maintain the mirror down position, when the superimposed display mode and the consecutive photographing mode are set.

BRIEF DESCRIPTION OF THE DRAWINGS

The aforementioned and other aspects, features, and advantages of present disclosure will be better understood by reference to the following detailed description when considered in connection with the accompanying drawings, wherein.

The accompanying drawings should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Some embodiments of the present disclosure are described below, but no limitation is indicated therein, and various applications and modifications may be made without departing from the scope of the invention.

First Embodiment

In the following description, a digital camera 1 realizing the imaging device and imaging method according to first embodiment is described with reference to FIGS. 1 to 3. An apparatus for realizing an imaging device and an imaging method is not limited to a digital camera, and various electrical equipment and electronic devices can be used.

The digital camera 1, for example, a digital single-lens reflex camera, includes an optical view finder (OVF), an electronic view finder (EVF), and a hybrid finder that overlaps the OVF display and the EVF display. Further, the digital camera has a continuous shooting mode that can be provided as one of the shooting modes of the camera.

Figure 1:
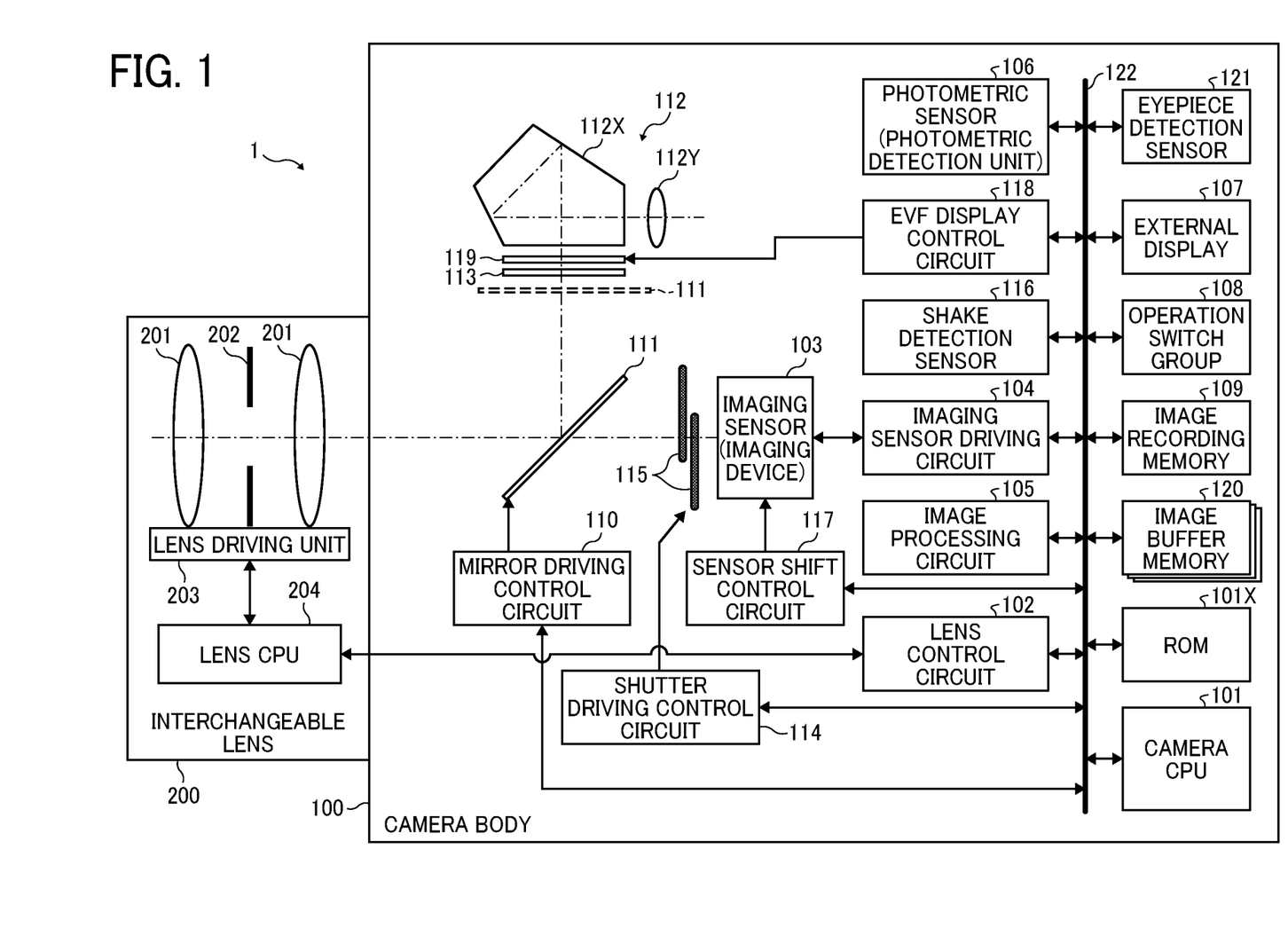
FIG. 1 is a block diagram of configuration of an image capturing device according to a first embodiment of the present disclosure.

FIG. 1 is a block diagram of an overall configuration of the digital camera 1 according to the first embodiment of the present disclosure. The digital camera 1 is configured by a camera body 100 having an imaging function and an interchangeable lens 200, which includes an imaging optical system and is detachably attached to the camera body 100.

The interchangeable lens 200 includes a plurality of lens units 201 (two in the illustrated example), a stop 202 provided between the plurality of lens units 201 (between the two lens units 201 in the illustrated example), a lens driving 203, and a lens CPU 204.

Each lens unit 201 provides positive or negative power (convergence or divergence) to the subject light in order to form the subject light on the imaging sensor 103 described below. The stop 202 adjusts its opening diameter so as to adjust the amount of light during shooting. The stop 202 also functions as a shutter for adjusting an exposure time when shooting still images. The lens unit 201 and the stop 202 are held so as to be movable in the optical axis direction and are moved in the optical axis direction by the lens driving unit 203 to perform zooming and focusing. The lens CPU 204 sends a command to the lens driving unit 203 to perform opening control of the stop 202 and zooming control and focusing control by the lens unit 201. The lens CPU 204 communicates with a camera CPU 101 (described below) via a lens side mount (illustration abbreviated).

The camera body 100 includes the camera CPU 101 that controls the camera body 100. The camera CPU 101 includes an arithmetic unit, a read-only memory (ROM) 101X, a random-access memory (RAM), an A/D converter, a D/A converter, and communication interface circuit. In FIG. 1, the ROM 101X of the camera CPU 101 is described with the reference numeral ROM 101X. Based on a predetermined program stored in the ROM 101X of the camera CPU 101, various circuits of the camera body 100 are driven to perform actions/processes such as zooming processing, focus adjustment processing (AF processing), photographing processing, image processing, recording processing, and the like. Lens control such as zooming processing and focus adjustment processing is executed by communicating with the lens CPU 204 via the lens control circuit 102, a camera-side mount contact (illustration abbreviated), and a lens-side mount (illustration abbreviated).

The camera body 100 includes an imaging sensor (imaging device) 103 on which subject light incident from a photographing optical system (the lens units 201 and diaphragm 202) of the interchangeable lens 200 forms an image. The imaging sensor 103 is composed of, e.g., a CCD or a CMOS sensor, and associated circuitry. The imaging sensor 103 includes a two-dimensional single-plate color sensor. In this sensor, light receiving devices are arranged on M pixels in the horizontal direction and on N pixels in the vertical direction, and a primary color mosaic filter on a Bayer array is formed on-chip (M and N are integers).

The imaging sensor driving circuit 104 controls the imaging operation of the imaging sensor 103 and transmits the acquired image signal to the camera CPU 101. The image processing circuit 105 performs processing such as color interpolation, (gamma) conversion, and image compression of the image acquired by the imaging sensor 103. Further, the image processing circuit 105 processes various information to be superimposed and displayed on the EVF. Further, the various information can be superimposed not only on the EVF display, but also on the display of the external display 107. Here, the various information can include information such as whiteout information, blackout information, focusing information, and contour information.

The imaging sensor 103 further includes a focus detection pixel on the imaging surface, and transmits the output of the focus detection pixel to the camera CPU 101. The camera CPU 101 calculates a defocus amount based on the acquired focus detection data and acquires information for driving the lens unit 201 for focusing.

A photometric sensor 106 is disposed, for example, in a finder optical system 112 described below, detects the brightness of the subject at the time of shooting, and transmits photometric data to the camera CPU 101. The camera CPU 101 calculates appropriate exposure conditions (exposure time, stop value, sensitivity, etc.) based on the acquired photometric data, and sets the operation of the digital camera 1. Although the configuration including a photometric sensor 106 is provided above, the output from the image sensor 103 can be used in place of the photometric sensor 106 by holding a shutter 115 (described below) in an open state.

The external display 107 is composed of, for example, an LCD, and displays a preview image at the time of shooting, a confirmation image after shooting, a reproduced image of the recorded image, information on the shooting mode of the camera, and other various information. An operation switch group 108 includes a power switch, a shooting switch, a shooting mode selection switch, and the like. An image recording memory 109 is, for example, a detachable memory, and records captured images including moving images and still images.

The mirror driving control circuit 110 controls mirror up/mirror down of a quick return half mirror (movable mirror) 111 constituted by a half mirror. The quick return half mirror 111 branches the light beam incident from the photographing optical system (including the lens unit 201 and stop 202) of the interchangeable lens 200 to the finder optical system 112 and the image sensor 103. Then, the light beam is formed on the focusing screen 113 and/or the imaging surface of the image sensor 103, respectively. The finder optical system 112 includes a pentaprism 112X and an eyepiece lens 112Y. The pentaprism 112X converts a subject image, which is primarily formed on the focusing screen 113 by reflecting by the quick return half mirror 111, into an erect image. The eyepiece 112Y is for a user to look at the erect image formed by the pentaprism 112X. The shutter driving control circuit 114 controls the exposure and light shielding to the image sensor 103 by controlling the opening and closing of the shutter 115 disposed immediately in front of the image sensor 103.

A shake detection sensor 116 detects a shake state of the digital camera 1, and transmits the shake data to the camera CPU 101. A sensor shift control circuit 117 controls the shift of the position of the image sensor 103 based on the shake data from the camera shake detection sensor 116, and then the sensor shift control circuit 117 performs shake correction control. As the shake detection sensor 116, for example, at least one of an angular acceleration sensor and an acceleration sensor can be used.

An EVF display control circuit 118 is disposed in the finder optical system 112 and performs display control of an EVF display 119 for superimposing and displaying the EVF (electronic viewfinder) display on the OVF (optical viewfinder) display. The EVF display 119 is a transmissive display, and for example, a transmissive organic EL display can be used. Thus, a hybrid viewfinder that superimposes an OVF (optical viewfinder) display and an EVF (electronic viewfinder) display is configured.

An image buffer memory 120 is a memory that temporarily stores various image data (recorded image data, external display image data, EVF display images data, and the like). The image buffer memory 120 is preferably a FIFO (First-In First-Out) type memory. Image data, read out from the image sensor 103 and subjected to image processing, are sequentially stored in the image buffer memory 120. Then, by sequentially reading out the image data from the image buffer memory 120, the image is displayed on the external display 107 and/or the EVF display 119. Further, the image is recorded in the image recording memory 109 by performing an image compression process or the like. At this time, by shifting the reading area of image data based on the shake data of the shake detection sensor 116, the shake can be corrected electronically without mechanically shifting the imaging sensor 103.

An eyepiece detection sensor 121 is a sensor that detects whether the eyepiece lens 112Y in the finder optical system 112 is being looked into by a user or not. For example, a time proximity sensor, such a time-of-flight (ToF) sensor, can be used.

Many components of the camera body 100 are connected to each other by a bus 122 so that various signals, data, and the like can be exchanged.

The configuration of the digital camera 1 described above is only an example, and various design changes can be made. For example, a hybrid finder is not limited to the configuration described above. A configuration can be adopted in which an EVF image is projected by arranging a half mirror in front of the eyepiece, as disclosed in Japanese Patent Publication No. 2017-038246. Alternatively, the components can achieve a hybrid finder using the structure described in the patent documents 1 and 2 mentioned above.

The quick return half mirror (movable mirror) 111 is composed of a half mirror, and the quick return half mirror (movable mirror) is moveable between a mirror-down position and a mirror-up position. The mirror-down position is that in which the quick return half mirror (movable mirror) 111 is inserted on the optical path to reflect the subject light to the finder optical system 112 and transmit the light to the image sensor (image sensor) 103. The mirror-up position is that in which the quick return half mirror (movable mirror) 111 is evacuated from the optical path to be able to pass through the subject light for the image sensor (image device) 103. In FIG. 1, the quick return half mirror (movable mirror) 111 in the mirror down position is drawn with a solid line, and the quick return half mirror (movable mirror) 111 in the mirror up position is drawn with a broken line.

Figure 2:
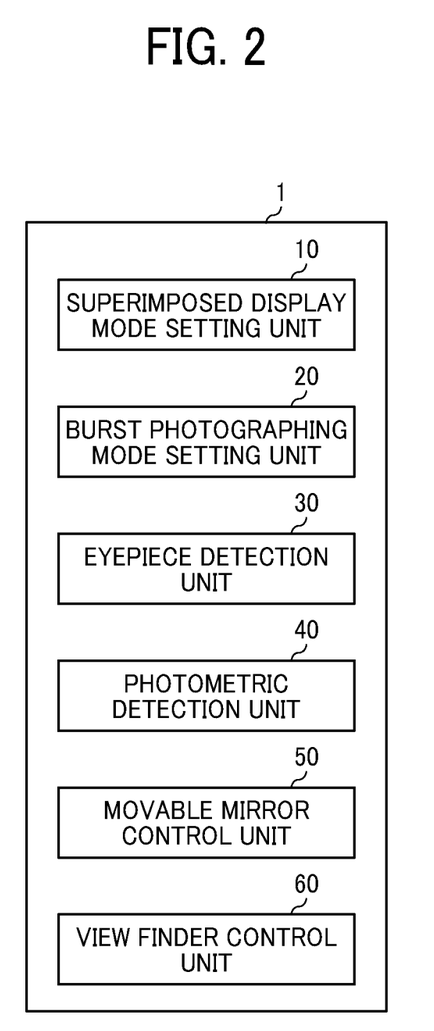
FIG. 2 is a block diagram of configuration of main parts of an image capturing device according to a first embodiment of the present disclosure.

FIG. 2 is a functional block diagram of the main configuration of the digital camera 1 according to the first embodiment of the present disclosure. The digital camera 1 includes a superimpose display mode setting unit 10, a consecutive photographing mode setting unit 20, an eyepiece detection unit 30, a photometric detection unit 40, a movable mirror control unit 50, and a view finder control unit 60.

The superimpose display mode setting unit 10 sets a superimpose display mode (hybrid finder) in which an optical image by the finder optical system 112 and an electronic image by the imaging sensor (imaging device) 103 are superimposed and displayed. For example, the user interface for setting the superimpose display mode (hybrid finder) includes the operation switch group 108. Alternatively, the superimpose display mode (hybrid finder) is automatically set based on a certain (predetermined) conditions. As discussed below, even when the superimpose display mode setting unit 10 sets the superimpose display mode (hybrid finder), the superimpose display mode (hybrid finder) is not necessarily executed. That is, the setting of the superimpose display mode (hybrid finder) may be enabled or disabled.

The consecutive photographing mode setting unit 20 sets a consecutive photographing mode. For example, the user interface for setting the consecutive photographing mode is the operation switch group 108. The consecutive photographing mode can also be set automatically based on a certain predetermined condition.

The eyepiece detection unit 30 detects the presence or absence of the user's eye in the finder optical system 112 (eyepiece lens 112Y). The eyepiece detection unit 30 can correspond to the eyepiece detection sensor 121 shown in FIG. 1.

The photometric detection unit 40 determines whether the photometric value (e.g., brightness) of the subject light is greater than or equal to a predetermined value. The photometric detection unit 40 can correspond to the photometric sensor 106 shown in FIG. 1.

The movable mirror control unit 50 controls the mirror up/mirror down operation of the quick return half mirror (movable mirror) 111 corresponding to other modes, when in at least one of the superimpose display mode (hybrid viewfinder) and the consecutive photographing mode. For example, the quick return half mirror (movable mirror) 111 can be allowed to rotate to the mirror-up position when the eyepiece detection unit 30 does not detect the user's eye in the finder optical system 112 (eyepiece lens 112Y).

The movable mirror control unit 50 controls the mirror up/mirror down operation of the quick return half mirror (movable mirror) 111 corresponding to other modes, when at least one of the superimpose display mode (hybrid viewfinder), and the consecutive photographing mode is not set. For example, the quick return half mirror (movable mirror) III may be allowed to rotate to the mirror-up position when the superimpose display mode (hybrid viewfinder) is not set, but the consecutive photographing mode is set. The mirror up/mirror down operation can be repeated with continuous shooting. Alternatively, in the live view mode in which neither the superimpose display mode (hybrid viewfinder) nor the consecutive photographing mode is set, the quick return half mirror (movable mirror) 111 can be maintained at the mirror up position.

Figure 3:
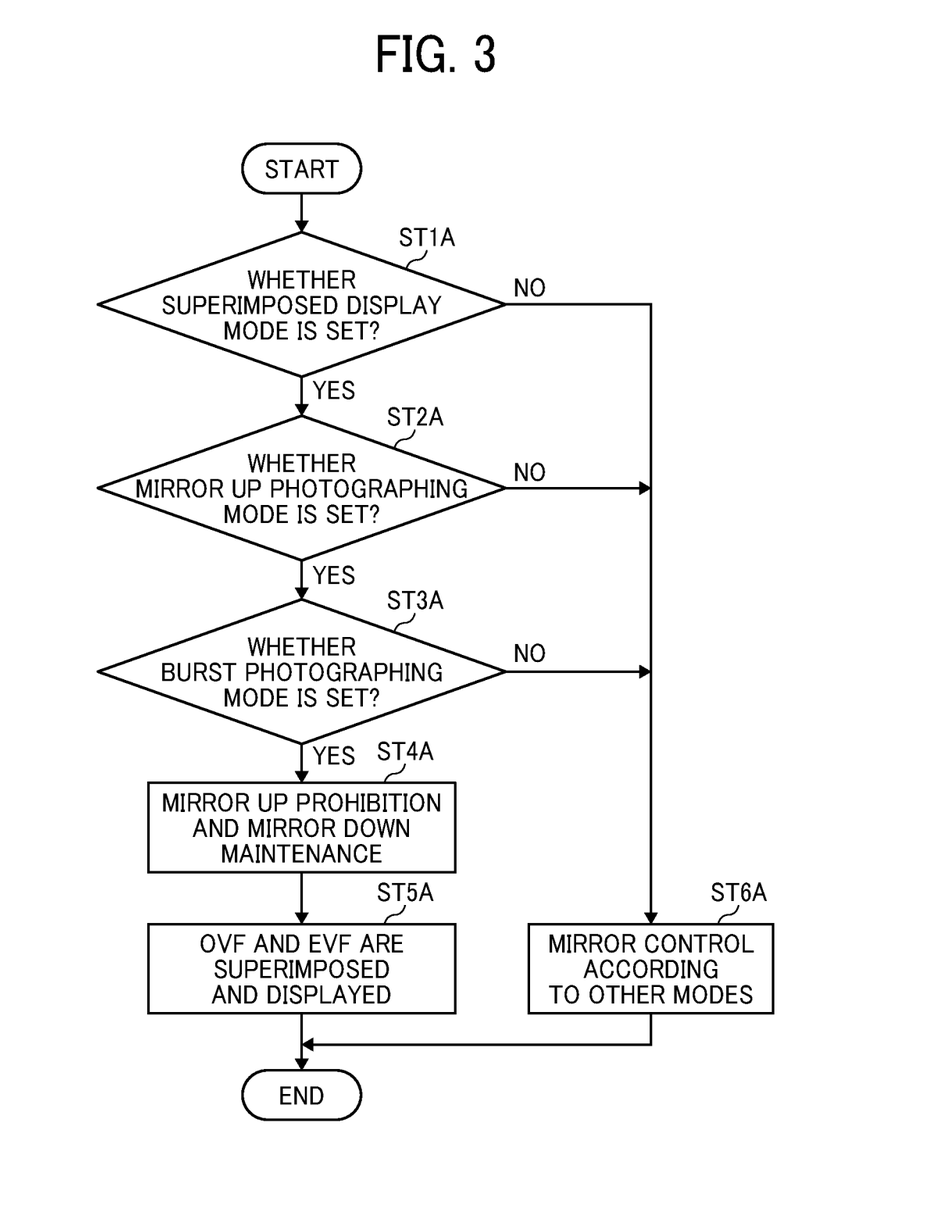
FIG. 3 is a flow chart of an operation of an image capturing device according to a first embodiment of the present disclosure.

The view finder control unit 60 controls the superimpose display mode setting unit 10 to set the superimpose display mode (hybrid finder) in which the optical image by the finder optical system 112 and the electronic image by the imaging sensor (imaging device) 103 are superimposed and displayed, when the movable mirror control unit 50 maintains the quick return half mirror (movable mirror) III at the mirror down position, FIG. 3 is a flow chart of the operation of the digital camera 1 according to the first embodiment of the present disclosure.

In step ST1A, it is determined whether the superimpose display mode hybrid finder) is set. When the superimpose display mode (hybrid finder) is set (YES in step ST1A), the process proceeds to step ST2A. When the superimpose display mode (hybrid finder) is not set (NO in step ST1A), the process proceeds to step ST6A, and the mirror up/mirror down operations of the quick return half mirror (movable mirror) 111 are controlled according to other modes, and the process is ended.

In the step ST2A, it is determined whether a mirror-up photographing mode is set. When the mirror-up photographing mode is set (YES in step ST2A), the process proceeds to step ST3A. When the mirror-up photographing mode is not set (NO in step ST2A), the process proceeds to step ST6A and the mirror up/mirror down operations of the quick return half mirror (movable mirror) 111 are controlled according to other modes and the process is ended. The mirror-up photographing mode includes both a photographing operation in a state maintaining mirror-up position and a photographing operation in a state of the mirror in quick return. Note that the process in step ST2A can be omitted (skipped) and the process can proceed from step ST1A to step ST3A.

In step ST3A, it is determined whether a consecutive photographing mode is set. When the consecutive photographing mode is set (YES in step ST3A), the process proceeds to step ST4A. When the consecutive photographing mode is not set (NO in step ST3A), the process proceeds to step ST6A, and the mirror up/mirror down operations of the quick return half mirror (movable mirror) 111 are controlled according to other modes and the process is ended.

In step ST4A, the movable mirror control unit 50 prohibits the quick return half mirror (movable mirror) 111 from rotating to the mirror up position and maintains the mirror down position.

In step ST5A, the view finder control unit 60 executes a superimpose display mode (hybrid finder) in which an optical image from the finder optical system 112 and an electronic image from the imaging sensor (imaging device) 103 are superimposed and displayed (OVF and EVF are superimposed).

By steps ST4A and ST5A, a "mirror-up prohibition and consecutive photographing mode" is executed in which continuous shooting is performed while OVF and EVF are superimposed and displayed, while the mirror-up operation of the quick return half mirror (movable mirror) 111 is prohibited. In the "mirror-up prohibition and consecutive photographing mode," the hybrid viewfinder in which the OVF and the EVF are superimposed is viewed in real time, so that it is possible to display a suitable (smooth and without time delay) viewfinder even during continuous shooting.

Second Embodiment

Figure 4:
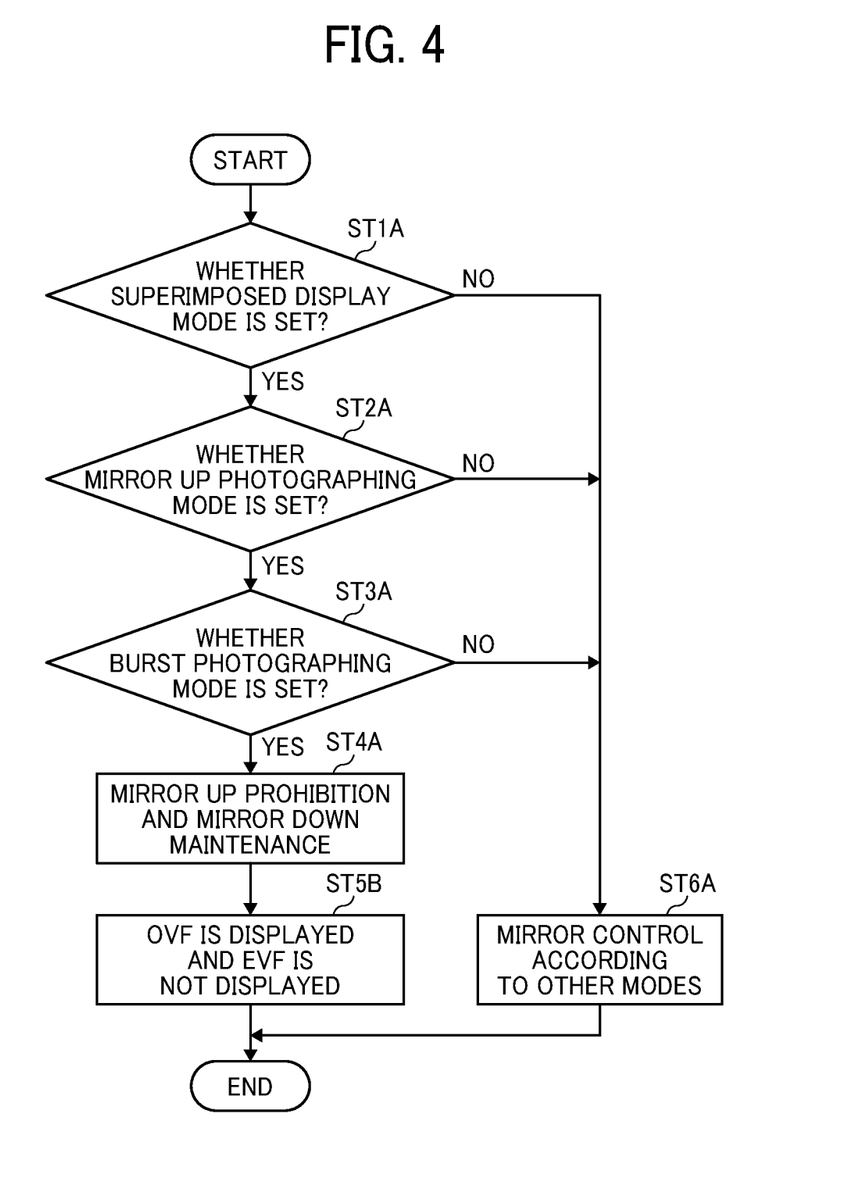
FIG. 4 is a flow chart of an operation of an image capturing device according to a second embodiment of the present disclosure.

FIG. 4 is a flow chart of the operation of the digital camera 1 according to the second embodiment of the present disclosure. The same parts as those in the flowchart of FIG. 3 of the first embodiment are denoted by the same step numbers, and redundant description is omitted.

In the flowchart of FIG. 4, the step ST5B is provided instead of the step ST5A of FIG. 1. In step ST5B, the view finder control unit 60 displays an optical image by the finder optical system 112 and does not display an electronic image by the imaging sensor (imaging device) 103. Thus the OVF display is performed and the EVF display is not performed.

As described above, in the second embodiment, the view finder control unit 60 displays an optical image by the finder optical system 112 and does not display an electronic image by the imaging sensor (imaging device) 103 when the quick return half mirror (movable mirror) 111 is held at the mirror down position by the movable mirror control unit 50.

The EVF image has a display delay with respect to the OVF image because of the image processing, and particularly when a subject has a large movement or when the camera is panned quickly, visibility can be reduced because the EVF image and the OVF image have a large gap. Therefore, in the second embodiment, only the OVF display is performed and the EVF display is not performed, so that the viewfinder display can be performed without reducing the visibility of the user, even in the above situation.

Third Embodiment

Figure 5:
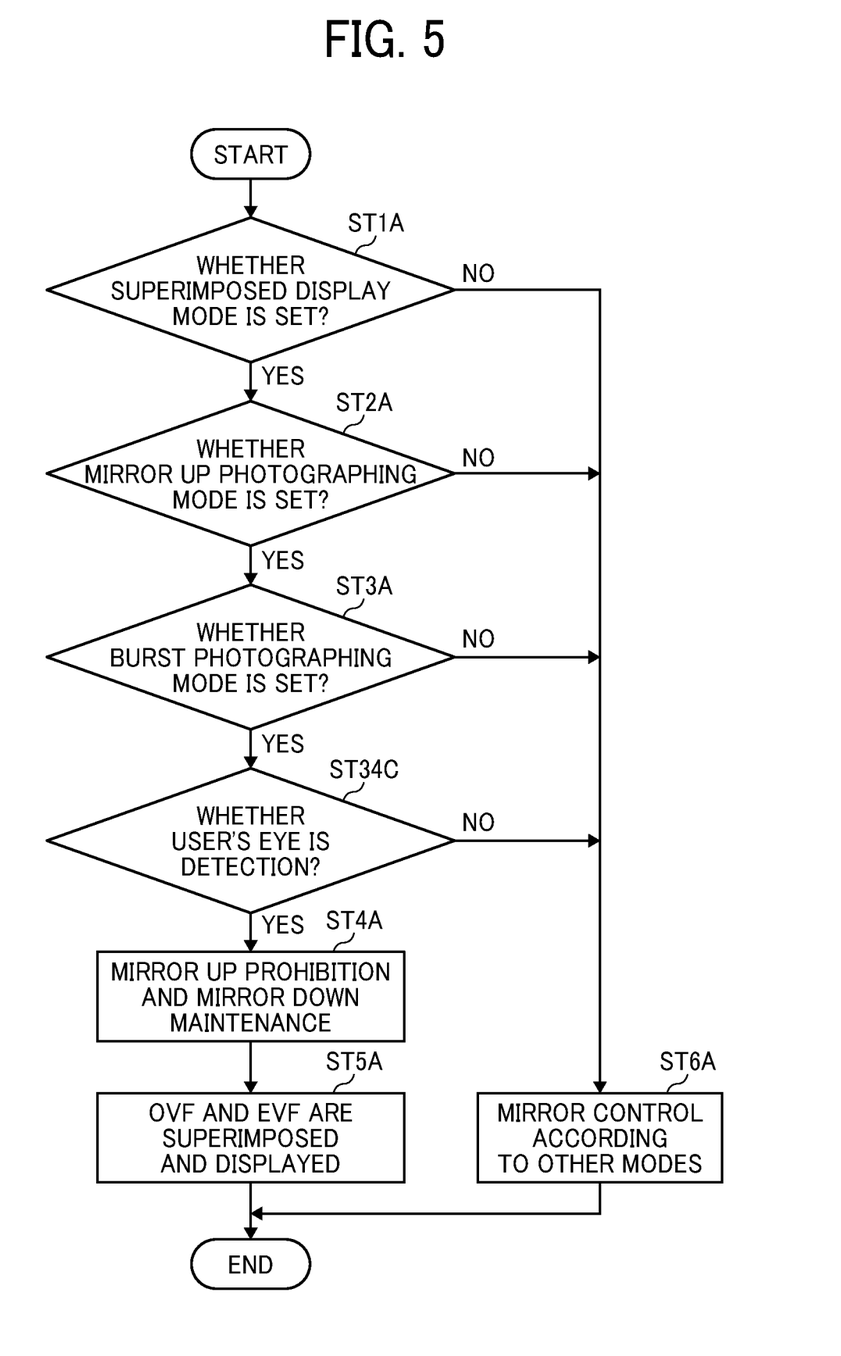
FIG. 5 is a flow chart of an operation of an image capturing device according to a third embodiment of the present disclosure.

In the third embodiment, the movable mirror control unit 50 controls the mirror up/mirror down operation of the quick return half mirror (movable mirror) 111. The control is determined based on whether the superimpose display mode (hybrid finder) is set by the superimpose display mode setting unit 10, whether the consecutive photographing mode is set by the consecutive photographing mode setting unit 20, and whether an user's eye is detected by the eyepiece detection unit 30 for the finder optical system 112 (eyepiece lens 112Y). More specifically, the movable mirror control unit 50 maintains the quick return half mirror (movable mirror) 111 at the mirror-down position and prohibits the mirror from rotating to the mirror-up position, when the superimposed display mode setting unit 10 sets the superimpose display mode (hybrid finder), the consecutive photographing mode setting unit sets the consecutive photographing mode, and the eyepiece detection unit 30 detects the user's eye in the finder optical system 112 (eyepiece lens 112Y).

The movable mirror control unit 50 controls the mirror up/mirror down operation of the quick return half mirror (movable mirror) 111 corresponding to other modes, when at least one of the superimposed display mode (hybrid viewfinder), the consecutive photographing mode, and the user's eye in the finder optical system 112 (eyepiece lens 112Y) is not detected. For example, the quick return half mirror (movable mirror) 111 can be allowed to rotate to the mirror-up position when the eyepiece detection unit 30 does not detect that the user's eye in the finder optical system 112 (eyepiece lens 112Y).

The view finder control unit 60 controls the superimposed display mode setting unit 10 to set the superimpose display mode (hybrid finder) in which the optical image by the finder optical system 112 and the electronic image by the imaging sensor (imaging device) 103 are superimposed and displayed, when the movable mirror control unit 50 maintains the quick return half mirror (movable mirror) 111 at the mirror down position.

FIG. 5 is a flow chart of the operation of the digital camera 1 according to the third embodiment of the present disclosure. The same parts as those in the flowchart of FIG. 3 of the first embodiment are denoted by the same step numbers, and redundant description is omitted.

In the flowchart of FIG. 5, step ST34C is inserted between step ST3A and step ST4A of FIG. 1. As in step ST34C, it is determined whether a user's eye is detected by the eyepiece detection unit 30 for the finder optical system 112 (eyepiece lens 112Y). When the user's eye is detected for the finder optical system 112 (eyepiece lens 112Y) (YES in step ST34C), the process proceeds to step ST4A. When the user's eye is not detected for the finder optical system 112 (eyepiece lens 112Y) (No in step ST34C), the process proceeds to step ST6A.

In the third embodiment, in addition to the setting of the superimpose display mode (hybrid finder) and the consecutive photographing mode, when the user's eye is detected by the finder optical system 112 (eyepiece lens 112Y), the "mirror-up prohibition and consecutive photographing mode" "is executed. An execution requirement of the "mirror-up prohibition and consecutive photographing mode" includes the user's eye detection with respect to the finder optical system 112 (eyepiece lens 112Y), so that the user will not perceive discontinuity of the display image during continuous shooting. Thus the visibility of the finder display can be further improved.

Fourth Embodiment

Figure 6:
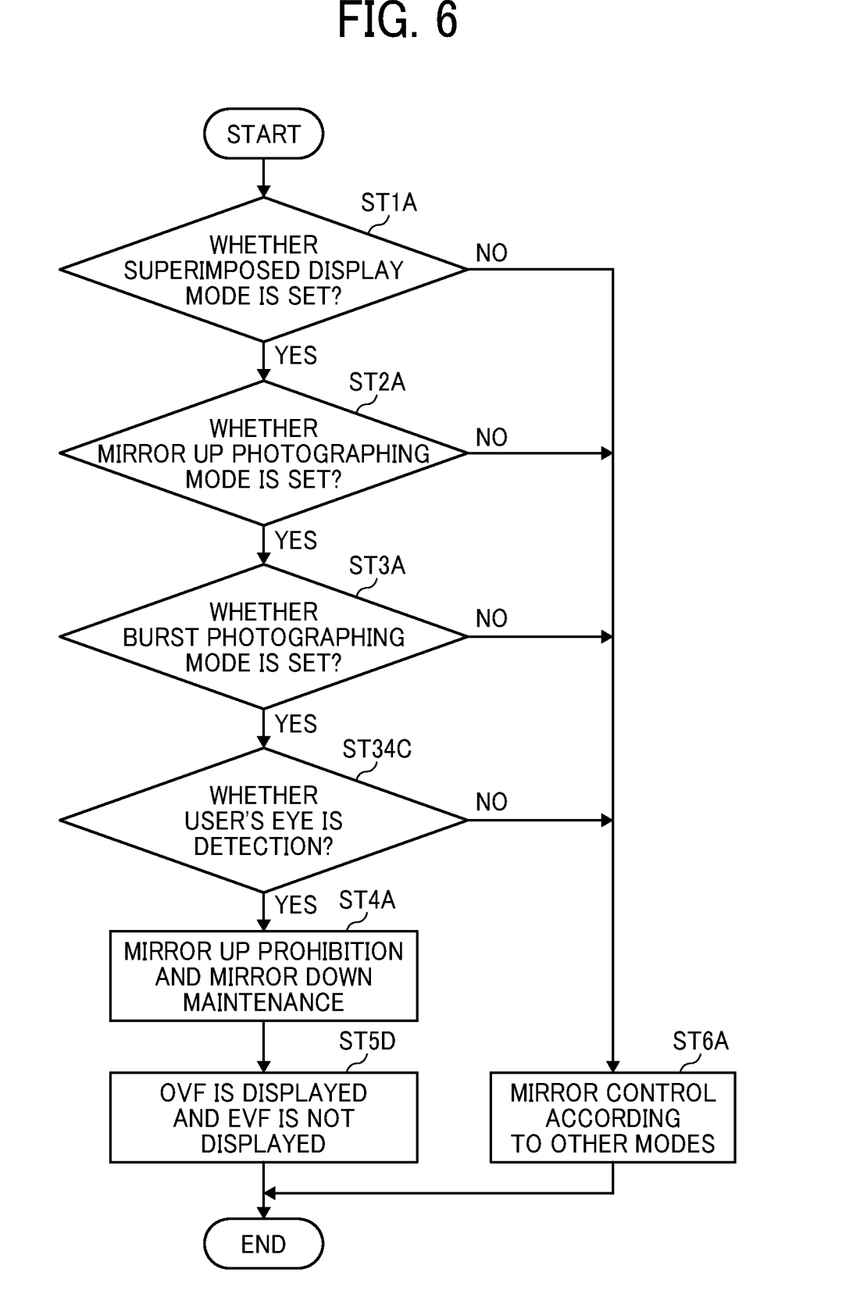
FIG. 6 is a flow chart of an operation of an image capturing device according to a fourth embodiment of the present disclosure.

FIG. 6 is a flow chart of the operation of the digital camera 1 according to the fourth embodiment of the present disclosure. The same parts as those in the flowchart of FIG. 5 of the third embodiment are denoted by the same step numbers, and redundant description is omitted.

The flowchart in FIG. 6 includes step ST5D instead of step ST5A in FIG. 5. In step ST5D, the view finder control unit 60 displays an optical image by the finder optical system 112 and does not display an electronic image by the imaging sensor (imaging device) 103. Thus, the OVF display is performed and the EVF display is not performed.

As described above, in the fourth embodiment, when the view finder control unit 60 maintains the quick return half mirror (movable mirror) 111 at the mirror-down position by the movable mirror control unit 50, the optical image is displayed by the finder optical system 112 and an electronic image by the imaging sensor (imaging device) 103 is not displayed.

Since image processing must be performed to display the EVF image, the display of the EVF image is delayed with respect the OVF image. For example, when a subject moves greatly or when the camera is panned quickly, a large deviation occurs between the EVF image and the OVF image, so the visibility could be lowered. As in the fourth embodiment, only the OVF display is performed and the EVF display is not performed, so that the viewfinder display can be performed without reducing the visibility of the user, even in the above situation.

Fifth Embodiment

Figure 7:
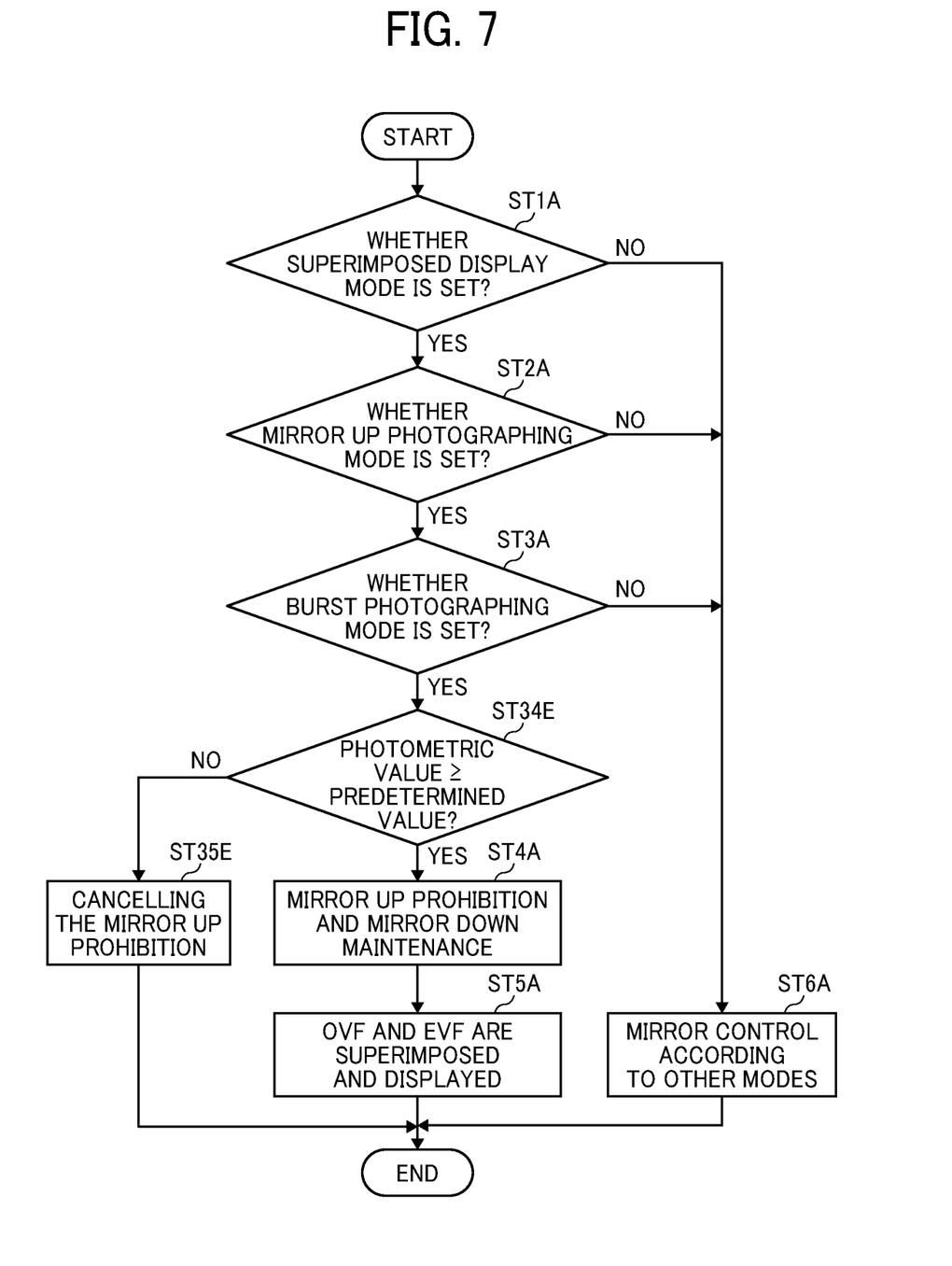
FIG. 7 is a flow chart of an operation of an image capturing device according to a fifth embodiment of the present disclosure.

In the fifth embodiment, the movable mirror control unit 50 controls the mirror up/mirror down operation of the quick return half mirror (movable mirror) 111. The control is determined based on whether the superimpose display mode (hybrid finder) is set by the superimpose display mode setting unit 10, whether the consecutive photographing mode is set by the consecutive photographing mode setting unit 20, and whether the photometric value (brightness) of the subject light is greater than or equal to a predetermined value, as determined by photometric detection unit 40. More specifically, the movable mirror control unit 50 maintains the quick return half mirror (movable mirror) 111 at the mirror-down position and prohibits the mirror from rotating to the mirror-up position, when the superimposed display mode setting unit 10 sets the superimpose display mode (hybrid finder), the consecutive photographing mode setting units 20 sets the consecutive photographing mode, and the photometric detection unit 40 detects that the photometric value (brightness) of the subject light is greater than or equal to the predetermined value.

The movable mirror control unit 50 controls the mirror up/mirror down operation of the quick return half mirror (movable mirror) 111 corresponding to other modes, when at least one of the conditions is not satisfied. The conditions are that the superimpose display mode (hybrid viewfinder) is set, the consecutive photographing mode is set, and the determination that the photometric value (brightness) of the subject light is greater than or equal to the predetermined value. For example, the quick return half mirror (movable mirror) 111 is allowed to rotate to the mirror-up position when the photometric value (brightness) of the subject light is determined to be less than the predetermined value.

The view finder control unit 60 controls the superimposed display mode setting unit 10 to set the superimpose display mode (hybrid finder), in which the optical image by the finder optical system 112 and the electronic image by the imaging sensor (imaging device) 103 are superimposed and displayed, when the movable mirror control unit 50 maintains the quick return half mirror (movable mirror) 111 at the mirror down position.

FIG. 7 is a flow chart of the operation of the digital camera 1 according to the fifth embodiment of the present disclosure. The same parts as those in the flowchart of FIG. 3 of the first embodiment are denoted by the same step numbers, and redundant description is omitted.

In the flowchart of FIG. 7, step ST34E is inserted between step ST3A and step ST4A of FIG. 1. In step ST34E, it is determined whether the photometric value (brightness) of the subject light is greater than or equal to a predetermined value. When the photometric value (e.g., brightness) of the subject light is greater than or equal to a predetermined value (YES in step ST34E), the process proceeds to step ST4A. When the photometric value (e.g., brightness) of the subject light is less than a predetermined value (No in step ST34C), the process proceeds to step ST35E. In step ST35E, the movable mirror control unit 50 allows the quick return half mirror (movable mirror) 111 to rotate to the mirror-up position. Thus, the movable mirror control unit 50 releases the mirror-up prohibition.

In the fifth embodiment, in addition to the setting of the superimpose display mode (hybrid finder) and the consecutive photographing mode, when the photometric value (brightness) of the subject light is greater than or equal to the predetermined value, the mirror-up prohibition and consecutive photographing mode is executed. An execution requirement of the mirror-up prohibition and consecutive photographing mode includes that the photometric value (brightness) of the subject light is greater than or equal to the predetermined value so that will the user will not perceive the darkness of the subject during shooting. The visibility of the finder display can be further improved.

Sixth Embodiment

Figure 8:
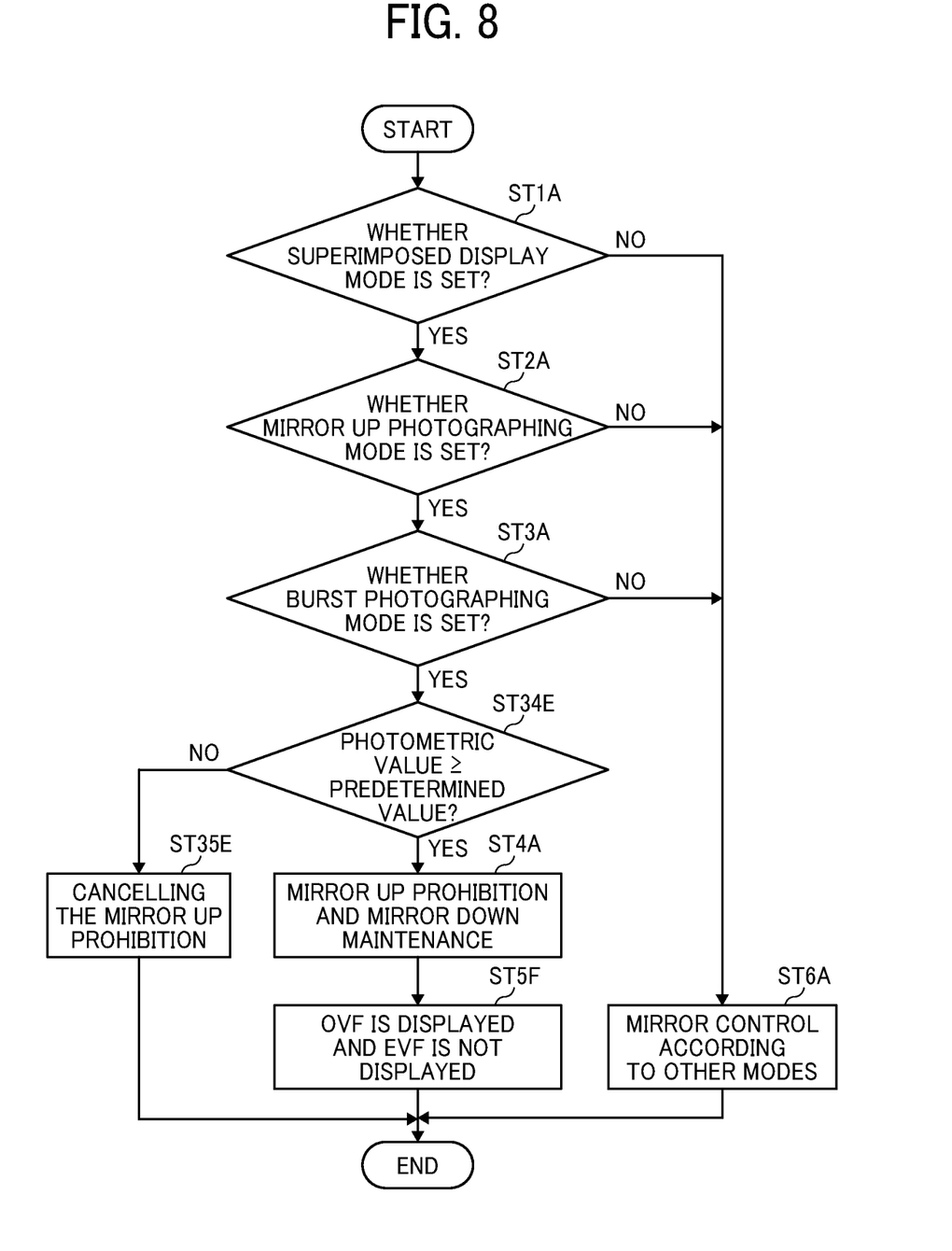
FIG. 8 is a flow chart of an operation of an image capturing device according to a sixth embodiment of the present disclosure.

FIG. 8 is a flow chart of the operation of the digital camera 1 according to the sixth embodiment of the present disclosure. The same parts as those in the flowchart of FIG. 7 of the fifth embodiment are denoted by the same step numbers, and redundant description is omitted.

The flowchart in FIG. 8 includes step ST5F instead of step ST5A in FIG. 7. In step ST5F, the view finder control unit 60 displays an optical image by the finder optical system 112 and does not display an electronic image by the imaging sensor (imaging device) 103. Thus, the OVF display is performed and the EVF display is not performed.

As described above, in the sixth embodiment, when the view finder control unit 60 maintains the quick return half mirror (movable mirror) 111 at the mirror-down position by the movable mirror control unit 50, the optical image by the finder optical system 112 is displayed, and an electronic image by the imaging sensor (imaging device) 103 is not displayed.

Since image processing must be performed to display the EVF image, the display of the EVF image is delayed with respect to the OVF image. For example, when a subject moves greatly or when the camera is panned quickly, a large deviation occurs between the EVF image and the OVF image, so the visibility could be lowered. As in the fourth embodiment, only the OVF display is performed and the EVF display is not performed, so that the viewfinder display can be performed without reducing the visibility of the user, even in the above situation.

Seventh Embodiment

Figure 9:
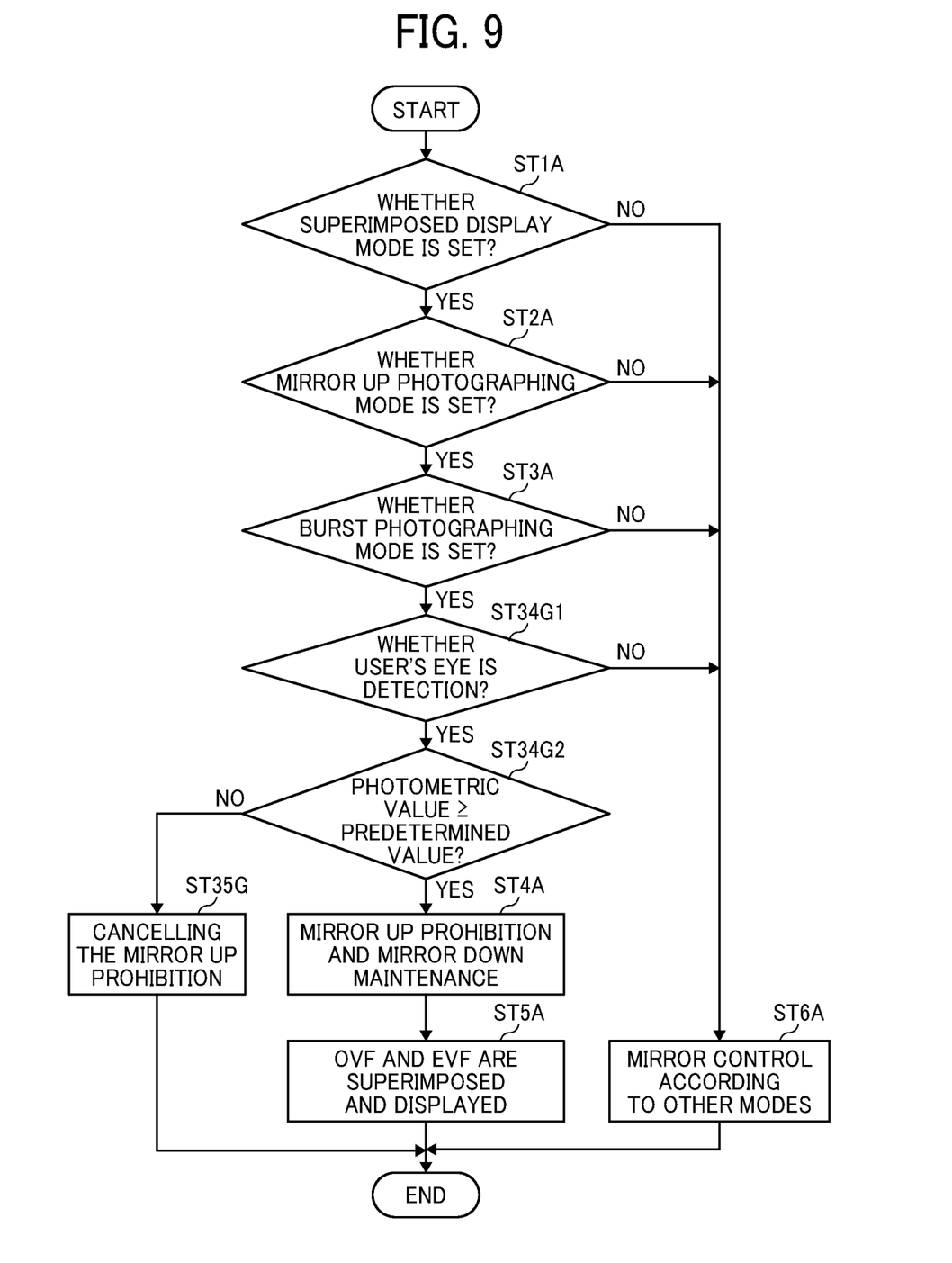
FIG. 9 is a flow chart of an operation of an image capturing device according to a seventh embodiment of the present disclosure.

In the seventh embodiment, the movable mirror control unit 50 controls the mirror up/mirror down operation of the quick return half mirror (movable mirror) 111. The control is determined based on whether the superimpose display mode (hybrid finder) is set by the superimpose display mode setting unit 10, whether the consecutive photographing mode is set by the consecutive photographing mode setting unit 20, whether an user's eye is detected by the eyepiece detection unit 30 for the finder optical system 112 (eyepiece lens 112Y), and whether the photometric value (brightness) of the subject light is greater than or equal to a predetermined value, as determined by the photometric detection unit 40. More specifically, the movable mirror control unit 50 maintains the quick return half mirror (movable mirror) 111 at the mirror-down position and prohibits it from rotating to the mirror-up position, when the superimposed display mode setting unit 10 sets the superimpose display mode (hybrid finder), the consecutive photographing mode setting unit 20 sets the consecutive photographing mode, the eyepiece detection unit 30 detects the user's eye in the finder optical system 112 (eyepiece lens 112Y), and photometric detection unit 40 detects that the photometric value (brightness) of the subject light is greater than or equal to the predetermined value.

The movable mirror control unit 50 controls the mirror up/mirror down operation of the quick return half mirror (movable mirror) 111 corresponding to other modes, when at least one of a plurality of conditions is not satisfied. The conditions are that the superimpose display mode (hybrid viewfinder) is set, the consecutive photographing mode is set, the user's eye to the finder optical system 112 (eyepiece lens 112Y) is detected, and the determination that the photometric value (brightness) of the subject light is greater than or equal to the predetermined value. For example, the quick return half mirror (movable mirror) 111 is allowed to rotate to the mirror-up position when the photometric value (brightness) of the subject light is determined to be less than the predetermined value.

The view finder control unit 60 controls the superimposed display mode setting unit 10, which sets the superimpose display mode (hybrid finder) in which the optical image by the finder optical system 112 and the electronic image by the imaging sensor (imaging device) 103 are superimposed and displayed, when the movable mirror control unit 50 maintains the quick return half mirror (movable mirror) 111 at the mirror do position.

FIG. 9 is a flow chart of the operation of the digital camera 1 according to the seventh embodiment of the present disclosure. The same parts as those in the flowchart of FIG. 3 of the first embodiment are denoted by the same step numbers, and redundant description is omitted.

In the flowchart of FIG. 9, step ST34G1 and step ST34G2 are inserted between step ST3A and step ST4A of FIG. 1. In step ST34G1, it is determined whether a user's eye is detected by the eyepiece detection unit 30 for the finder optical system 112 (eyepiece lens 112Y). When the user's eye is detected for the finder optical system 112 (eyepiece lens 112Y) (YES in step ST34G1), the process proceeds to step ST34G2. When the user's eye is not detected for the finder optical system 112 (eyepiece lens 112Y) (No in step ST34G1), the process proceeds to step ST6A. In step ST34G2, it is determined whether the photometric value (e.g., brightness) of the subject light is greater than or equal to a predetermined value. When the photometric value (e.g., brightness) of the subject light is greater than or equal to the predetermined value (YES in step ST34G2), the process proceeds to step ST4A. When the photometric value (brightness) of the subject light is less than the predetermined value (No in step ST34G2), the process proceeds to step ST35G.

In step ST35G, the movable mirror control unit 50 allows the quick return half mirror (movable mirror) 111 to rotate to the mirror-up position. Thus, the movable mirror control unit 50 releases the mirror-up prohibition.

In the seventh embodiment, in addition to the setting of the superimpose display mode (hybrid finder) and the consecutive photographing mode, when the user's eye is detected for the finder optical system 112 (eyepiece lens 112Y) and the photometric value (brightness) of the subject light is greater than or equal to the predetermined value, the mirror-up prohibition and consecutive photographing mode is executed. An execution requirement of the mirror-up prohibition and consecutive photographing mode includes the user's eye detection with respect to the finder optical system 112 (eyepiece lens 112Y), so that the user will not perceive discontinuity of the display image during continuous shooting, and the visibility of the finder display can be further improved. An execution requirement of the mirror-up prohibition and consecutive photographing mode includes that the photometric value (brightness) of the subject light is greater than or equal to a predetermined value, so that the user will not perceive the darkness of the subject during shooting and the visibility of the finder display can be further improved.

Eighth Embodiment

Figure 10:
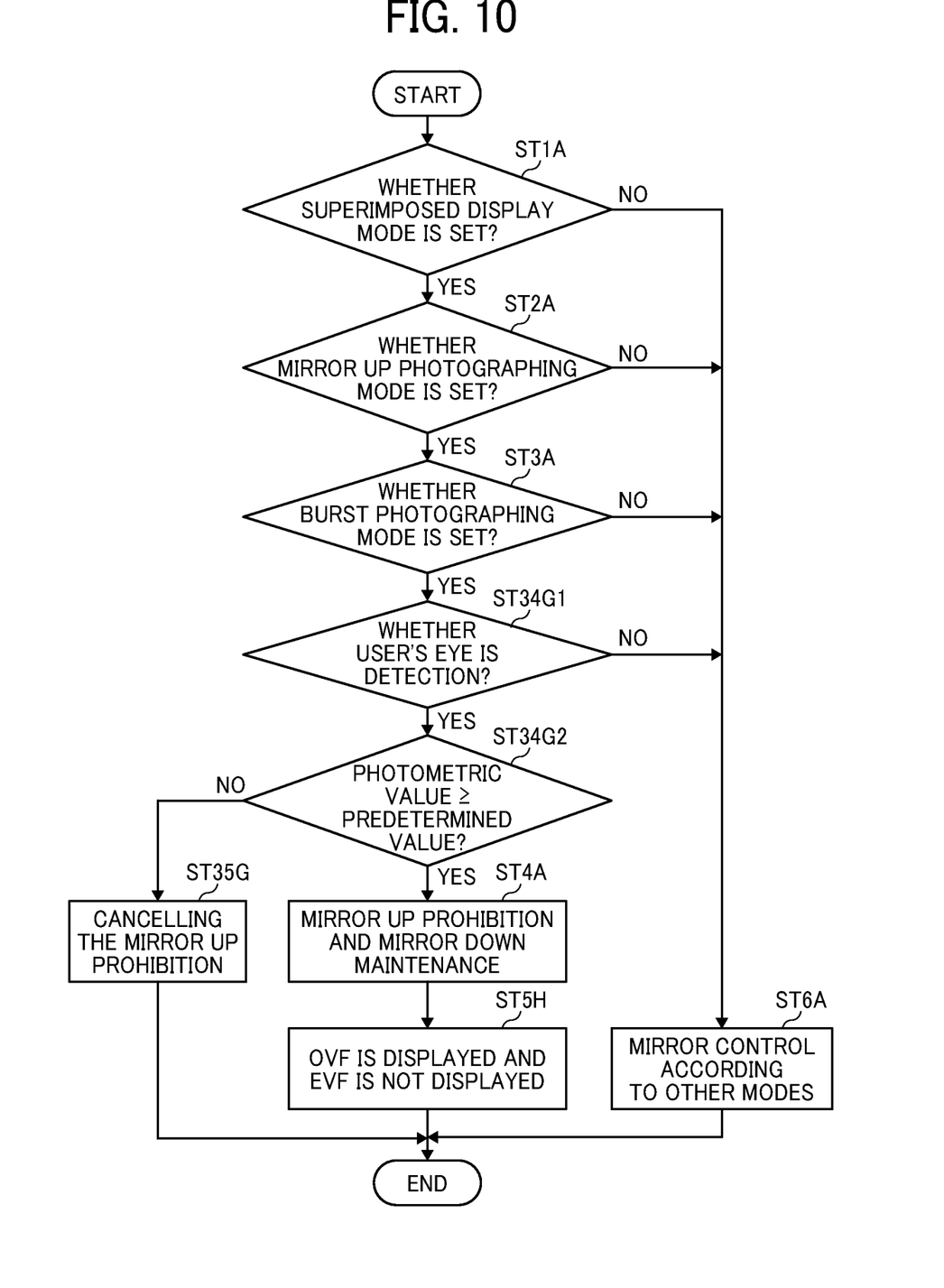
FIG. 10 is a flow chart of an operation of an image capturing device according to an eighth embodiment of the present disclosure.

FIG. 10 is a flow chart of the operation of the digital camera 1 according to the eighth embodiment of the present disclosure. The same parts as those in the flowchart of FIG. 9 of the seventh embodiment are denoted by the same step numbers, and redundant description is omitted.

The flowchart in FIG. 10 includes step ST5H instead of step ST5A in FIG. 9. In step ST5H, the view finder control unit 60 displays an optical image by the finder optical system 112 and does not display an electronic image by the imaging sensor (imaging device) 103. Thus, the OVF display is performed and EVF display is not performed.

As described above, in the sixth embodiment, when the view finder control unit 60 maintains the quick return half mirror (movable mirror) 111 at the mirror-down position by the movable mirror control unit 50, the optical image by the finder optical system 112 is displayed and an electronic image by the imaging sensor (imaging device) 103 is not displayed.

Since image processing must be performed to display the EVF image, the display of the EVF image is delayed with respect to the OVF image. For example, when a subject moves greatly or when the camera is panned quickly, a large deviation occurs between the EVF image and the OVF image, so the visibility could be lowered. As in the fourth embodiment, only the OVF display is performed and the EVF display is not performed, so that the viewfinder display can be performed without reducing the visibility of the user, even in the above situation.

The invention claimed is:
1. An image capturing device, comprising:
a movable mirror including a half mirror;
eyepiece detection circuitry configured to detect whether an eye of a user is looking into a viewfinder optical system; and
circuitry configured to
set (1) a superimpose display mode that superimposes and displays an optical image of a finder optical system and an electronic image captured by an image sensor, and
(2) a consecutive photographing mode, control the movable mirror to rotate between (1) a mirror-down position, in which the mirror is inserted in a photographing optical path, reflects light to a finder optical system, and transmits the light to an image sensor, and (2) a mirror-up position in which the mirror is retracted from the photographing optical path and the light passes through to the image sensor, and prohibit the movable mirror from rotating to the mirror-up position and maintain the mirror-down position, under a condition that the superimpose display mode and the consecutive photographing mode are both set and the eyepiece detection circuitry detects that the eye of the user is looking into the view finder optical system.

2. The image capturing device according to claim 1, further comprising:

photometric circuitry configured to detect whether a photometric value of the subject light is greater than or equal to a predetermined value, wherein the circuitry is further configured to prohibit the movable mirror from rotating to the mirror-up position and maintain the mirror-down position under a condition that the superimposed display mode and the consecutive photographing mode are both set, the eyepiece detection circuitry detects that the eye of the user is looking into the view finder optical system, and the photometric value is greater than or equal to the predetermined value.

3. The image capturing device according to claim 2, wherein under a condition that the photometric detection circuitry determines that the photometric value of the subject light is less than a predetermined value, the circuitry is further configured to allow the movable mirror to rotate to the mirror-up position.

4. The imaging capturing device according to claim 1, wherein the circuitry is further configured to superimpose and display the optical image of the finder optical system and the electronic image captured by the image sensor, under a condition that the movable mirror maintains the mirror-down position.

5. The imaging capturing device according to claim 1, wherein the circuitry is further configured to display the optical image of the finder optical system and not display the electronic image captured by the image sensor, under a condition that the movable mirror maintains the mirror-down position.

6. An imaging capturing method, comprising:

setting a superimposed display mode that superimposes and displays an optical image by a finder optical system and an electronic image by an image sensor, and setting a consecutive photographing mode, controlling a half mirror to rotate between (1) a mirror-down position in which the mirror is inserted in a photographing optical path, reflects light to a finder optical system, and transmits the light to an image sensor, and (2) a mirror-up position in which the mirror is retracted from the photographing optical path and the light passes through to the image sensor, and detecting whether an eye of a user is looking into a viewfinder optical system, wherein the controlling step further includes prohibiting the movable mirror from rotating to the mirror-up position and maintaining the mirror-down position, under a condition that the superimpose display mode and the consecutive photographing mode are set and it is detected in the detecting step that the eye of the user is looking into the view finder optical system.

7. The image capturing device method of claim 6, further comprising:

detecting whether a photometric value of the subject light is greater than or equal to a predetermined value, wherein the controlling step further comprises prohibiting the movable mirror from rotating to the mirror-up position and maintain the mirror-down position under a condition that the superimposed display mode and the consecutive photographing mode are both set, it is detected in the detecting step that the eye of the user is looking into the view finder optical system, and the photometric value is greater than or equal to the predetermined value.

8. The image capturing method of claim 7, wherein under a condition that the detecting step detects that the photometric value of the subject light is less than a predetermined value, the controlling step further comprises allowing the movable mirror to rotate to the mirror-up position.

9. The imaging capturing method of claim 6, wherein the controlling step further comprises superimposing and displaying the optical image of the finder optical system and the electronic image captured by the image sensor, under a condition that the movable mirror maintains the mirror-down position.

10. The imaging capturing method of to claim 6, wherein the controlling step further comprises displaying the optical image of the finder optical system and not displaying the electronic image captured by the image sensor, under a condition that the movable mirror maintains the mirror-down position.

11. An image capturing device, comprising:

a movable mirror including a half mirror;

photometric circuitry configured to detect whether a photometric value of the subject light is greater than or equal to a predetermined value; and circuitry configured to set (1) a superimpose display mode that superimposes and displays an optical image of a finder optical system and an electronic image captured by an image sensor, and (2) a consecutive photographing mode, control the movable mirror to rotate between (1) a mirror-down position, in which the mirror is inserted in a photographing optical path, reflects light to a finder optical system, and transmits the light to an image sensor, and (2) a mirror-up position in which the mirror is retracted from the photographing optical path and the light passes through to the image sensor, and prohibit the movable mirror from rotating to the mirror-up position and maintain the mirror-down position, under a condition that the superimpose display mode and the consecutive photographing mode are both set and the photometric value is greater than or equal to the predetermined value.

12. The image capturing device according to claim 11, further comprising:

eyepiece detection circuitry configured to detect whether an eye of a user is looking into a viewfinder optical system wherein the circuitry is further configured to prohibit the movable mirror from rotating to the mirror-up position and maintain the mirror-down position under a condition that the superimposed display mode and the consecutive photographing mode are both set, the eyepiece detection circuitry detects that the eye of the user is looking into the view finder optical system, and the photometric value is greater than or equal to the predetermined value.

13. The image capturing device according to claim 11, wherein under a condition that the photometric detection circuitry determines that the photometric value of the subject light is less than a predetermined value, the circuitry is further configured to allow the movable mirror to rotate to the mirror-up position.

14. The imaging capturing device according to claim 11, wherein the circuitry is further configured to superimpose and display the optical image of the finder optical system and the electronic image captured by the image sensor, under a condition that the movable mirror maintains the mirror-down position.

15. The imaging capturing device according to claim 11, wherein the circuitry is further configured to display the optical image of the finder optical system and not display the electronic image captured by the image sensor, under a condition that the movable mirror maintains the mirror-down position.

* * * * *